United States Patent
Pitsch et al.

(10) Patent No.: US 6,384,946 B1
(45) Date of Patent: May 7, 2002

(54) ELECTRICAL ISOLATION BETWEEN IR RECEIVER AND FURTHER ELECTRONIC CIRCUITS

(75) Inventors: Robert Alan Pitsch, Carmel; Nancy Dawn Boettner, Indianapolis; John Palmer Manning, Fishers; Carlton Jethro Simmons, Jr., Fortville; Albert Louis Doyle, Plainfield, all of IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/091,329

(22) PCT Filed: Dec. 17, 1996

(86) PCT No.: PCT/US96/19929

§ 371 Date: Jun. 16, 1998

§ 102(e) Date: Jun. 16, 1998

(87) PCT Pub. No.: WO97/23954

PCT Pub. Date: Jul. 3, 1997

Related U.S. Application Data

(60) Provisional application No. 60/009,178, filed on Dec. 22, 1995.

(30) Foreign Application Priority Data

Jan. 2, 1996 (GB) .............................................. 9600002
Jun. 28, 1996 (GB) .............................................. 9613608

(51) Int. Cl.$^7$ ............................................. H04B 10/18
(52) U.S. Cl. ........................ 359/161; 359/144; 250/551
(58) Field of Search ................................. 359/161, 142, 359/144, 172; 250/551

(56) References Cited

U.S. PATENT DOCUMENTS

| 4,300,018 A | * 11/1981 | Rademaker ................. 359/161 |
| 4,760,355 A | 7/1988 | Dash et al. ................... 333/12 |
| 6,191,563 B1 | * 2/2001 | Bangerter .................... 323/211 |

FOREIGN PATENT DOCUMENTS

| EP | 448087 | 3/1991 |
| JP | 3-163938 | 7/1991 |
| WO | 92/03881 | 3/1992 |

OTHER PUBLICATIONS

Patent Abstracts of Japan, vol. 015, No. 401, Oct. 11, 1997 & Japan 3–163938.

* cited by examiner

Primary Examiner—Leslie Pascal
(74) Attorney, Agent, or Firm—Joseph S. Tripoli; Robert D. Shedd

(57) ABSTRACT

An electronic system including a connector for an external device such as an infrared receiver includes a signal processor, responsive to the infrared receiver and an electrical isolation device such as an optocoupler, coupled between the connector and the signal processor. Such a system can further include electromagnetic interference suppression circuitry such as a ferrite bead, capacitors coupled to the earth potential, coupled between the connector and the optocoupler. Such a system can also further include electrostatic discharge suppression circuitry resistors coupled between the connector and the optocoupler.

16 Claims, 1 Drawing Sheet

ELECTRICAL ISOLATION BETWEEN IR RECEIVER AND FURTHER ELECTRONIC CIRCUITS

Figure 1:
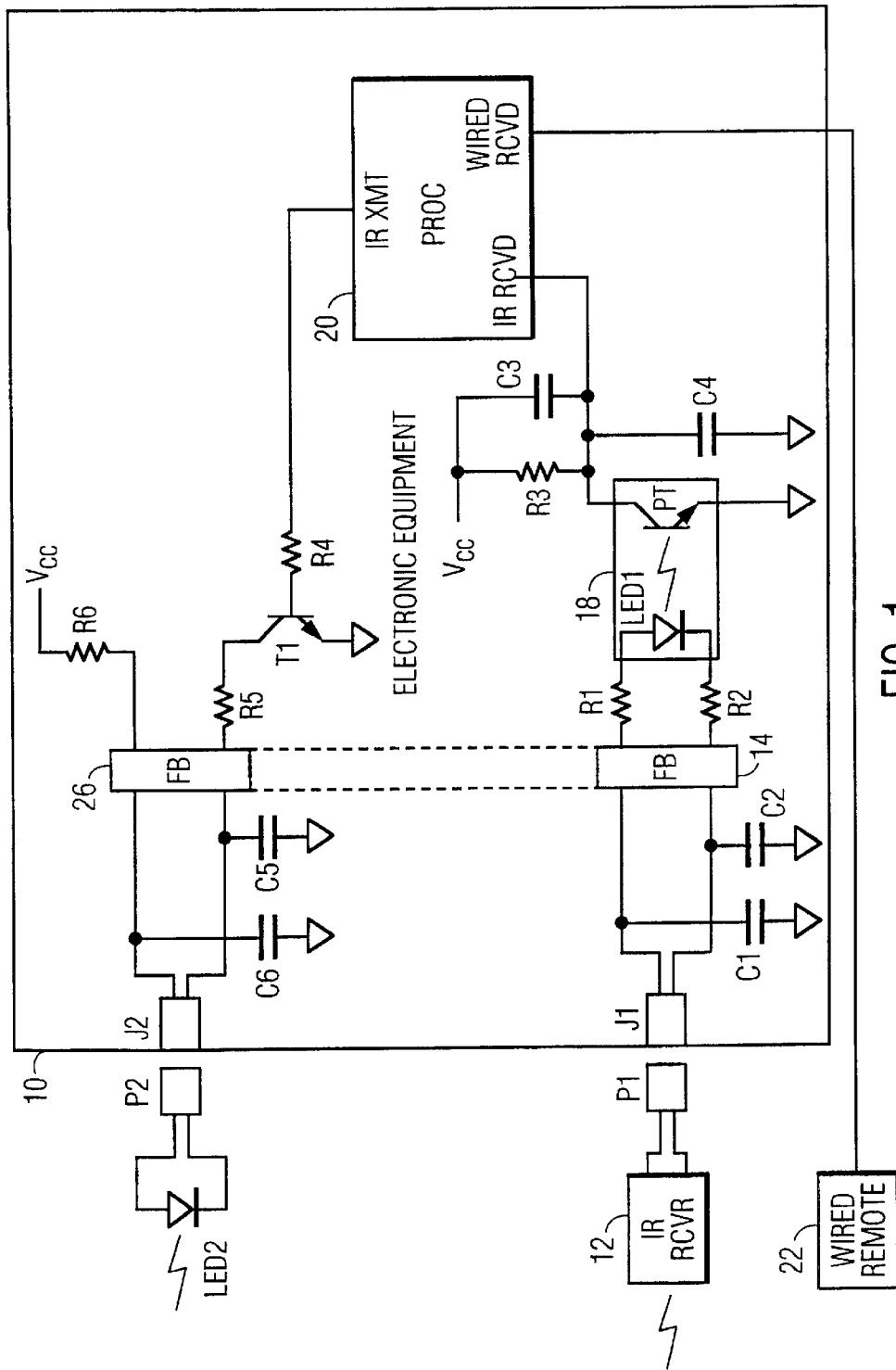

This application claims benefit of provisional application No. 60/009,178 filed Dec. 22, 1995.

The present invention relates to circuitry for isolating a detachable external device from electronic equipment containing the signal processing circuitry for the external device.

Current consumer electronic equipment often is expandable by the consumer. For example, current receivers for direct satellite television systems (DSS) include plugs into which infrared (IR) remote control receivers and transmitters may be plugged. The external IR remote control receiver connection permits a user to place a television in one room and the satellite receiver in another room, and still allow the user to control the satellite receiver using an IR remote control unit. The external IR remote control transmitter permits the satellite receiver to control an external device, such as a VCR, which is responsive to IR remote control signals, all in a known manner.

However, whenever an external unit is connected by a wire to electronic equipment, it is possible to create ground loops, which results in distortion and possible malfunction of the equipment. It is further possible that an electrostatic charge present in the external device will discharge through the electronic equipment when the external device is plugged in, thus, damaging the electronic equipment. It is also possible for the wire connecting the external device to the electronic equipment to emit electromagnetic interference (EMI), which can affect external equipment. In addition, in consumer electronic equipment it is possible that the external device plugged into the plug will be the wrong device, or that it will be configured incorrectly. For all of these reasons, it is desirable to provide circuitry in electronic equipment which includes a slug for external devices to electrically isolate the external device from the electronic equipment, to isolate potential electrostatic discharge (ESD) damage from the electronic equipment, and to minimize EMI emissions.

In accordance with principles of the present invention, an electronic system, including a connector for an external device, includes a signal processor, responsive to the external device and an electrical isolation device, coupled between the external device connector and the signal processor. Such a system can further include electromagnetic interference suppression circuitry coupled between the external device connector and the electrical isolation device. Such a system can also further include electrostatic discharge suppression circuitry coupled between the external device connector and the electrical isolation device.

In the drawing:

FIG. 1 is a schematic diagram of an isolation circuit according to principles of the present invention.

In FIG. 1, electronic equipment is illustrated generally as box 10. This electronic equipment 10 is controllable in response to user commands, either from a control panel on the enclosure in which the electronic equipment 10 is placed, or via a remote control device connected by wires to the electronic equipment 10, or via a infrared (IR) remote control which may be connected to the electronic equipment via a plug. In the illustrated embodiment, the electronic equipment 10 also includes a channel for controlling external equipment via an IR link, although this is not necessary, and is not a part of the present invention.

In FIG. 1, a IR receiver 12 is configured to receive IR signals (indicated by the lightning-like symbol) from an IR remote control device (not shown), in a known manner. Respective first and second output terminals of the IR receiver 12 are coupled to a first plug P1. The first plug P1 is connectable to a first jack J1 on the electronic equipment 10. A first terminal of the first jack J1 is coupled to a first electrode of a first capacitor C1, and, through a first passage in a common ferrite bead 14, to a first electrode of a first resistor R1. A second electrode of the first capacitor C1 is coupled to a source of reference potential (ground). A second electrode of the first resistor R1 is coupled to an anode of a first light emitting diode LED1. A cathode of the first light emitting diode LED1 is coupled to a first electrode of a second resistor R2. A second electrode of the second resistor R2 is coupled through a second passage through the common ferrite bead 14 to a first electrode of a second capacitor C2 and a second terminal of the first jack J1. A second electrode of the second capacitor C2 is coupled to ground.

The first light emitting diode LED1 supplies a light signal to a photo transistor PT. The combination of the first light emitting diode LED1 and the photo transistor PT form an opto-isolator 18. An emitter electrode of the photo transistor PT is coupled to ground. A collector electrode of the photo transistor PT is coupled to respective first electrodes of a third resistor R3, a third capacitor C3 and a fourth capacitor C4, and to an IR-received remote control input terminal of a processor 20. Respective second electrodes of the third resistor R3 and the third capacitor C3 are coupled to a source of operating voltage $V_{cc}$. A second electrode of the fourth capacitor C4 is coupled to ground. A remote control unit 22 is coupled by wires to a wired remote control input terminal of the processor 20.

The processor 20 also includes an IR-transmit (IR XMIT) remote control output terminal coupled to a first electrode of a fourth resistor R4. A second electrode of the fourth resistor R4 is coupled to a gate electrode of a first NPN transistor T1. An emitter electrode of the first transistor T1 is coupled to ground. A collector electrode of the first NPN transistor T1 is coupled to a first electrode of a fifth resistor R5. A second electrode of the fifth resistor R5 is coupled through a first passage in a second common ferrite bead 26 to a first electrode of a fifth capacitor C5 and a first terminal of a second jack J2. The second jack J2 is coupleable to a second plug P2. When inserted, a first terminal of the second plug P2 is coupled to the first terminal of the second jack J2. The first terminal of the second plug P2 is coupled to a cathode of a second light emitting diode LED2. The second light emitting diode LED2 emits an IR light signal (indicated by the lightning like symbol) which may be used to control external IR remote control controllable electronic equipment (not shown) such as VCRs and/or television receivers. An anode of the second light emitting diode LED2 is coupled to a second terminal of the second plug P2. The second terminal of the second plug is coupled to a second terminal of the second jack J2. The second terminal of the second jack J2 is coupled to a first input terminal of a sixth capacitor C6 and, through a second passage in the second common ferrite bead 26, to a first electrode of a sixth resistor R6. A second electrode of the sixth resistor R6 is coupled to the source of operating voltage $V_{cc}$. Although the first and second common ferrite beads, 14 and 26, are described as being separate, in a preferred embodiment, they are formed as a single ferrite bead with four respective passages, as illustrated in phantom in FIG. 1.

In operation, the IR receiver 12 produces an electrical signal which represents the IR signal received from the external IR emitting device (not shown). The IR representative signal from the IR receiver 12 is applied to the first light emitting diode LED1, which produces a signal corresponding to the IR light signal being received. The first and second resistors, R1 and R2 operate as current limiters for the first light emitting diode LED1. They also provide some protection against electrostatic discharge. The common ferrite bead 14 minimizes common mode EMI radiation, and the combination of the common ferrite bead 14, and the first and second capacitors, C1 and C2, respectively, operate to minimize electromagnetic interference signals from adversely affecting operation of external electronic equipment, and the internal electronic equipment 10. The opto-isolator 18 provides electrical isolation between the external circuitry (e.g. the IR receiver 12) plugged into the first jack J1 and the electronic equipment 10. This prevents spurious signals, which are sometimes caused by ground loops when separate pieces of electronic equipment are connected together, from adversely affecting operation of the electronic equipment 10, and further prevents damage to the electronic equipment 10 from electrostatic discharge. The opto-isolator 18 also provides protection against possible short circuits in the external circuitry, and prevents damage to the electronic equipment 10 from a user plugging the wrong device into the first jack J1.

In a preferred embodiment, the IR signal from the remote control device (not shown) represents a command in the form of a series of code pulses. The code pulses are pulse modulated on a carrier signal of around 56 kHz. The first light emitting diode LED1 produces light pulses which correspond to the IR carrier light pulses received by the IR receiver 12. That is, a series of 56 kHz light pulses occurs during a code pulse, and no light pulses between code pulses. The photo transistor PT operates to switch on and off in response to those light pulses. The third resistor R3 provides a load for the photo transistor PT. The third and fourth capacitors, C3 and C4, respectively, operate to filter out the 56 kHz carrier component, leaving only the code pulse envelope. This code pulse envelope is supplied to the IR-received input terminal of the processor 20. The processor 20 processes the signal at the IR-received input terminal to decode the code pulses and determine which command has been sent by the IR remote control unit (not shown). The processor 20 then controls other elements (not shown) of the electronic equipment 10 to execute the received command, in a known manner.

The processor 20 also may control an external device. In a preferred embodiment, such an external device is controllable through an IR link. The processor 20 produces a command for the external device at its IR transmit (IR XMIT) output terminal. The second light emitting diode LED2 is an IR light emitting diode, and is coupled in the collector path of the first NPN transistor T1. The load for the first NPN transistor T1, coupled to the source of operating voltage $V_{cc}$ consists of the serial connection of the sixth resistor R6, the second light emitting diode LED2 and the fifth resistor R5. The signal at the IR transmit output terminal of the processor 20 controls the first NPN transistor T1 to turn on and off in a manner appropriate to send a command to the external device. When the first NPN transistor T1 is on, the second light emitting diode LED2 emits light, and when the first NPN transistor T1 is off, the second light emitting diode LED2 is dark.

In a preferred embodiment, the processor 20 produces a signal at its IR transmit output terminal which represents a series of command code pulses modulated on a carrier, as described above, in such a manner that the external device will respond appropriately. The specific required command codes and carrier frequencies vary depending upon the type of external device being controlled, and the manufacturer of that device. Generally, the carrier frequency for commands sent to such external devices can vary from 30 to 60 kHz. This series of modulated command pulses are converted into IR light pulses by the second light emitting diode LED2. The external device responds appropriately to the receipt of this command. In a similar manner as described above, the combination of the second common ferrite bead 26, and the fifth and sixth capacitors, C5 and C6, respectively, operate to minimize the adverse affects of electromagnetic interference on external electronic equipment, and the internal electronic equipment 10.

Although the illustrated embodiment of the invention was of electronic equipment including a source of external control plugged into a jack, one skilled in the art will understand that the isolation circuit of the present invention is applicable to any piece of electronic equipment which includes a external jack into which a user may plug an external device. In such a system, the present invention will provide protection against the adverse affects of EMI, ESD and ground loops on the electronic equipment, and against the possibility of a short circuit in the external equipment or of a user plugging the wrong device into the external jack or plugging a device in incorrectly.

Table I, below, discloses preferred values for the components illustrated in FIG. 1.

TABLE I

| Component Values | | | |
|---|---|---|---|
| Comp. | Value Ω | Comp. | Value f. |
| R1 | 390 | C1 | 100 p |
| R2 | 390 | C2 | 47 p |
| R3 | 10 k | C3 | 330 p |
| R4 | 1 k | C4 | .01 μ |
| R5 | 10 | C5 | 100 p |
| R6 | 36 | C6 | 47 p |

What is claimed is:

1. Electronic equipment connectable to external devices and able to provide electrical isolation from the external devices connected thereto, said electronic equipment comprising:

a connection port for connecting the external device to said electronic equipment;

a signal processor for receiving and processing signals received at said connection device from the external device; and an electrical isolation device connected between said connection port and said signal processor for electrically isolating said electronic equipment from the external device thereby preventing damage to said electronic equipment due to electrostatic discharge;

an electromagnetic interference suppression circuitry coupled between the connection port and the electrical isolation device wherein the electromagnetic interference suppression circuitry comprises a capacitor coupled between the external device connector and a source of reference potential.

2. The electronic equipment of claim 1, wherein the electrical isolation device comprises an opto-isolator.

3. The electronic system of claim 2 wherein:

the external device connector comprises a first and a second terminal; and the opto-isolator comprises a light emitting diode having an anode coupled to the first external device connector terminal and a cathode coupled to the second external device connector.

4. The electronic equipment of claim 1, further comprising electrostatic discharge suppression circuitry coupled between the connection port and the electrical isolation device.

5. The electronic system of claim 4 wherein the electrostatic discharge suppression circuitry comprises a resistor coupled between the external device connector and the electrical isolation device.

6. The electronic system of claim 5 wherein:
the external device connector comprises a first terminal and a second terminal;
the electrical isolation device comprises a first input terminal and a second input terminal; and
the electrostatic discharge suppression circuitry comprises a first resistor coupled between the first terminal of the external device connector and the first input terminal of the electrical isolation device, and a second resistor coupled between the second terminal of the external device connector and the second input terminal of the electrical isolation device.

7. The electronic equipment of claim 1, wherein the electromagnetic interference suppression circuitry comprises an inductive reactance element coupled between the connection port and the electrical isolation device.

8. The electronic system of claim 7 wherein the inductive reactance element is a ferrite bead.

9. The electronic system of claim 8 wherein:
the external device connector comprises a first and a second terminal;
the electrical isolation device comprises a first input terminal and a second input terminal; and
the electrostatic interference suppression circuitry comprises a first passage through the ferrite bead coupled between the first terminal of the external device connector and a second passage through the ferrite bead coupled between the second terminal of the external device connector and the first input terminal of the electrical isolation device, and the second input terminal of the electrical isolation device.

10. The electronic equipment of claim 1, wherein:
the external device is an IR receiver connected to the connection port;
the electronic equipment further comprises an IR signal processor; and
the electrical isolation device is coupled between the IR receiver and the IR signal processor.

11. The electronic equipment of claim 1, wherein:
the electronic equipment is a direct satellite system receiver;
the signal processor is a remote control processor;
the external device is a remote control signal receiver; and
the electrical isolation device is an opto-isolator.

12. The electronic system of claim 11 wherein:
the remote control signal receiver includes circuitry adapted to receive coded control signals modulated on an IR light carrier signal;
the opto-isolator comprises a light emitting diode coupled to the remote control signal receiver through the external device connector and a photo transistor responsive to light signals from the light emitting diode for generating signals representing the modulated coded control signals; and the electronic system further comprises circuitry for demodulating the modulated coded control representative signals from the photo transistor and generating a signal representing the coded control signals.

13. The electronic system of claim 12 wherein:
the electrical isolation device comprises the serial connection of a load resistor and a main conduction path of the photo transistor coupled between a source of operating potential and a source of reference potential; and
the demodulating circuitry comprises a first capacitor coupled between the junction of the load resistor and the main conductive path of the photo transistor and the source of operating potential and a second capacitor coupled between the junction of the load resistor and the main conductive path of the photo transistor and the source of reference potential.

14. Electronic equipment connectable to external devices and able to provide electrical isolation from the external devices connected thereto, said electronic equipment comprising:
a connection port for connecting the external device to said electronic equipment;
a signal processor for receiving and processing signals received at said connection device from the external device;
an electromagnetic interference suppression circuitry coupled between the connection port and the electrical isolation device, said electromagnetic interference suppression circuitry comprises an inductive reactance element, formed as a ferrite bead, coupled between the connection port and the electrical isolation device, wherein:
the electrostatic interference suppression circuitry comprises a first passage through the ferrite bead coupled between the connection port and the electrical isolation device and a second passage through the ferrite bead coupled between the connection port and the electrical isolation device.

15. The electronic equipment of claim 14, further comprising electrostatic discharge suppression circuitry coupled between the connection port and the electrical isolation device.

16. Electronic equipment connectable to external devices and able to provide electrical isolation from the external devices connected thereto, said electronic equipment comprising:
said electronic equipment is a direct satellite system receiver;
a connection port for connecting the external device to said electronic equipment; said external device is a remote control signal receiver;
a signal processor for receiving and processing signals received at said connection device from the external device, said signal processor is a remote control processor;
an electrical isolation device connected between said connection port and said signal processor for electrically isolating said electronic equipment from the external device thereby preventing damage to said electronic equipment due to electrostatic discharge, said electrical isolation device is an opto-isolator;
said remote control signal receiver includes circuitry adapted to receive coded control signals modulated on an IR light carrier signal;
said opto-isolator comprises a light emitting diode coupled to the remote control signal receiver through the connection port and a photo transistor responsive to light signals from the light emitting diode for generating signals representing the modulated coded control signals; and said electronic equipment further comprises circuitry for demodulating the modulated coded control representative signals from the photo transistor and generating a signal representing the coded control signals wherein:

said electrical isolation device comprises the serial connection of a load resistor and a main conduction path of the photo transistor coupled between a source of operating potential and a source of reference potential; and said demodulating circuitry comprises a first capacitor coupled between the junction of the load resistor and the main conductive path of the photo transistor and the source of operating potential and second capacitor coupled between the junction of the load resistor and the main conductive path of the photo transistor and the source of reference potential.

* * * * *